United States Patent [19]

Thayer et al.

[11] Patent Number: 5,072,246
[45] Date of Patent: Dec. 10, 1991

[54] SELF PHOTOGRAPHY BOOTH AND METHOD

[76] Inventors: Donald O. Thayer; Michael D. Thayer, both of 250 Meacham Ave., Elmont, N.Y. 11003

[21] Appl. No.: 439,642

[22] Filed: Nov. 20, 1989

[51] Int. Cl.[5] .................. G03B 29/00; G03B 13/08; G03B 15/06; H04N 5/225
[52] U.S. Cl. .................................... 354/78; 354/220; 354/290; 358/909
[58] Field of Search .................. 354/75, 76, 77, 78, 354/80, 81, 220, 290; 358/909; 40/124; 312/321.5; 211/88

[56] References Cited

U.S. PATENT DOCUMENTS

| | | | |
|---|---|---|---|
| 1,794,142 | 2/1931 | Boston | 354/220 |
| 1,799,866 | 4/1931 | Roth | 354/290 |
| 1,926,657 | 9/1933 | Simjian | 354/220 |
| 2,625,857 | 1/1953 | Simjian | 354/220 |
| 2,796,801 | 6/1957 | Simjian | 354/76 |
| 3,341,026 | 10/1965 | Spitler | 312/321.5 |
| 3,398,664 | 8/1968 | Bonatsos | 354/81 |
| 3,653,314 | 4/1972 | Swann | 95/44 A |
| 3,812,506 | 5/1974 | Klebanow | 354/80 |
| 3,864,708 | 2/1975 | Allen | 354/290 |
| 4,089,017 | 5/1978 | Buldini | 354/81 |
| 4,618,239 | 10/1986 | Sakamoto | 354/477 |
| 4,738,526 | 4/1988 | Larish | 354/412 |
| 4,804,983 | 2/1989 | Thayer, Jr. | 354/76 |
| 4,805,037 | 2/1989 | Noble et al. | 358/335 |
| 4,835,563 | 5/1989 | Larish | 354/412 |

FOREIGN PATENT DOCUMENTS 3018722 11/1981 Netherlands ............... 354/76

*Primary Examiner*—L. T. Hix
*Assistant Examiner*—Jae N. Noh
*Attorney, Agent, or Firm*—Shlesinger, Arkwright & Garvey

[57] ABSTRACT

A self photography system comprises a photographic camera having an image inlet. A video camera has an image inlet and an image outlet, and the video camera is disposed proximate the photographic camera. A pane of semitransparent material is aligned with and disposed forwardly of the camera image inlets. A video display is operably connected to the video camera image inlet for displaying the image perceived by the video camera image inlet. The video display is aligned with the pane for displaying the image thereon.

46 Claims, 3 Drawing Sheets

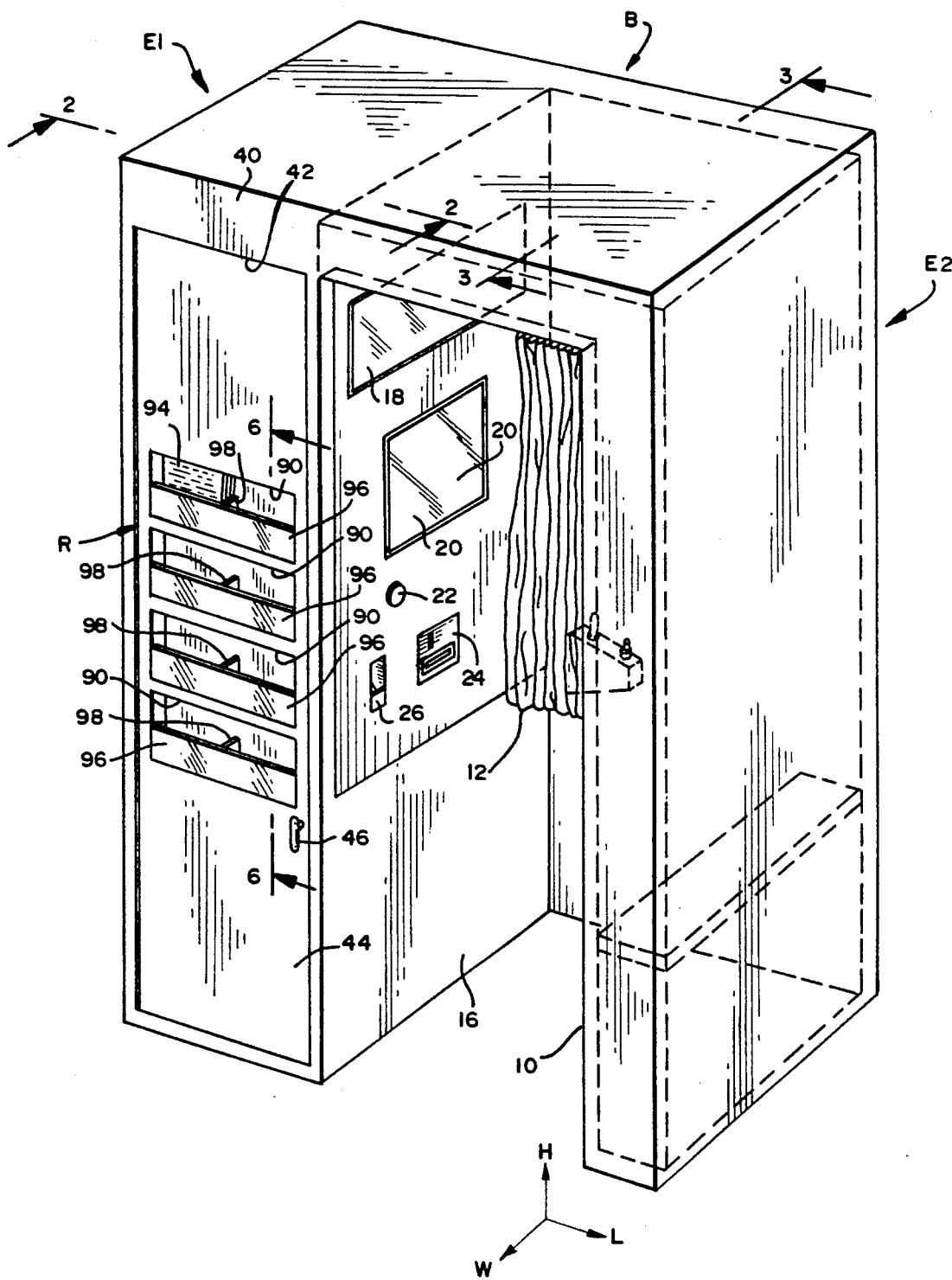

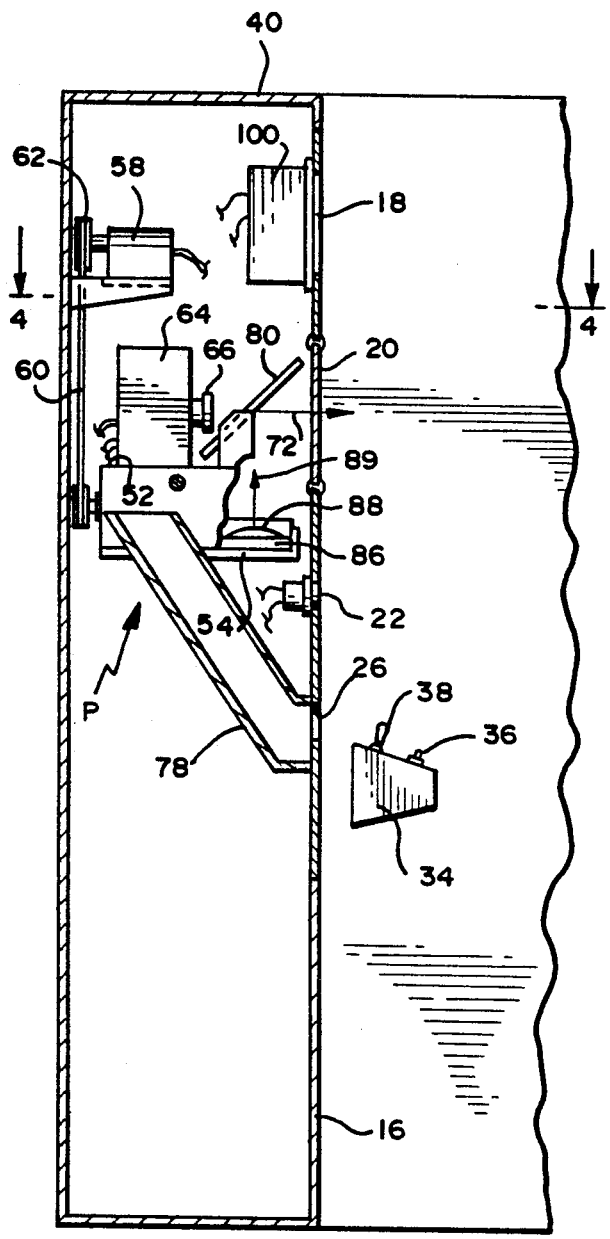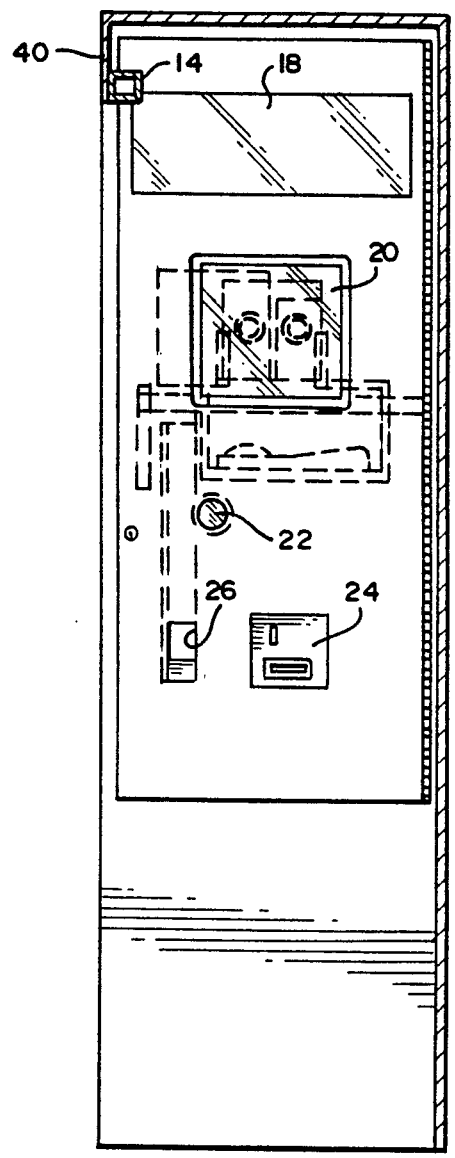

SELF PHOTOGRAPHY BOOTH AND METHOD

BACKGROUND OF THE INVENTION

The prior art discloses a number of photography booths permitting the user to cause the selective exposure of a length of photographic film so that a photograph will be taken. These booths tend to be relatively large, thereby limiting the number of locations where they can be placed. Should conventional photographic film be used, then additional complications arise by the need to have the film developed. U.S. Pat. No. 4,804,983 of Donald O. Thayer for PHOTOGRAPHY BOOTH AND METHOD, the disclosure of which is incorporated herein by reference, discloses a photography booth having a video camera and video display coupled to a conventional film camera.

Prior art photography booths have utilized a number of different schemes for permitting the user to strike a desired pose prior to the film being exposed. The cited Thayer patent discloses the use of a video display below the film camera, while it is also known to use a reflective mirror and a timer. Systems using self-developing film, such as that marketed by Polaroid Corporation, are known. The prior art does not, however, teach or suggest a photography booth which is sufficiently compact so as to be sized for a conventional display rack, while also assuring that the photograph taken is of a pose desired by the user.

Retail establishments are constantly searching for new vehicles for increasing customer flow, and thereby total sales. Many retail establishments, such as greeting card stores, have product display racks which are of a standard size and layout. These racks tend to be relatively small, in order to facilitate substitution and positioning in establishments of different size.

Those skilled in the art will appreciate that there is a need for a photography booth which is sufficiently compact in size in order to increase the number of locations where the booth may be placed. There is also a need for a photography booth which not only increases traffic flow at the retail location, but which also directly contributes to sales volume. The disclosed invention meets these needs, and provides a photography booth of greatly simplified design and size.

OBJECTS AND SUMMARY OF THE INVENTION

The primary object of the disclosed invention is to provide a photography booth which is of reduced design and complexity in order to increase the number of locations where the booth may be placed.

An additional object of the disclosed invention is to provide a photography booth which has an integral photograph holder display rack for generating additional sales volumes based upon photographs and holders sold.

A self photography system according to the invention comprises a photographic camera having an image inlet. A video camera has an image inlet and an image outlet, and the video camera is disposed proximate the photographic camera. A pane of semi-transparent material is aligned with and disposed forwardly of the photographic and video camera image inlets. A video display means is operably connected to the video camera image outlet for displaying the image perceived by the video camera image inlet. The video display means is aligned with the pane for displaying the image thereon.

A self photography booth comprises an enclosure having first and second spaced side walls interconnected by spaced first and second end walls. One of the side walls has an entrance therein permitting access to the interior of the enclosure. At least a first opening is provided in one of the end walls. A self photography system is operably associated with the first opening and is disposed exteriorly relative to the associated end wall. The self photography system comprises a photographic camera having an image inlet directed at the other of said end walls, a video camera having an image inlet directed at the other of said end walls in substantial alignment with the photographic camera image inlets so that the image inlet perceive substantially the same image. A semi-transparent mirror is interposed between the cameras and the other of said end walls. A video display has the inlet thereof operably connected to the video camera and the outlet thereof directed at the mirror so that the image perceived by the video camera is reflected by the mirror through the first opening. Means are positioned in the enclosure and operably connected to the photographic camera for causing selective operation thereof.

A self-service photography system comprises a housing having first and second integral enclosures. The enclosures each have an interior and are of substantially equal height and width but dissimilar length. The first enclosure includes a pivotal door securing an opening to the interior thereof. An accessway is disposed in the second enclosure for permitting access to the interior thereof. A self photography system is positioned in the first enclosure for permitting a user within the second enclosure to have a photograph taken thereof. At least a first rack means is secured to the door for displaying and permitting retrieval of a photograph holder disposed therein.

The method of taking a self portrait comprises the steps of providing a self photography system comprising adjacently disposed photographic and video cameras, a semi-transparent angularly disposed mirror in front of the image inlets of the cameras, and a video display below the cameras for directing the image perceived by the video camera into alignment with the image inlet of the film camera. The user poses in front of the cameras. The image perceived by the video camera is viewed by the user by looking at the mirror and thereby looking into the image inlet of the photographic camera. Once an appropriate pose is selected, then the photographic camera is operated.

These and other objects and advantages of the invention will be readily apparent in view of the following description and drawings of the above described invention.

DESCRIPTION OF THE DRAWINGS

The above and other Objects and advantages and novel features of the present invention will become apparent from the following detailed description of the preferred embodiment of the invention illustrated in the accompanying drawings, wherein:

FIG. 1 is a perspective view of a photography booth according to the invention;

FIG. 2 is a fragmentary cross-sectional view taken along the line 2—2 of FIG. 1 and viewed in the direction of the arrows;

FIG. 3 is a cross-sectional view taken along the line 3—3 of FIG. 1 and viewed in the direction of the arrows;

DESCRIPTION OF THE INVENTION

Photography booth B, as best shown in FIG. 1, comprises integral enclosures E1 and E2. The enclosures E1 and E2 preferably have equal width and height but dissimilar length, with height, width and length being indicated by the arrows H, W and L, respectively, of FIG. 1. Preferably, the booth B has a width of two feet, an overall length, comprising the enclosures E1 and E2, of four feet, and a height of more than six feet. This size is preferred, because it corresponds to the footprint of a standard greeting card display rack.

Figure 4:
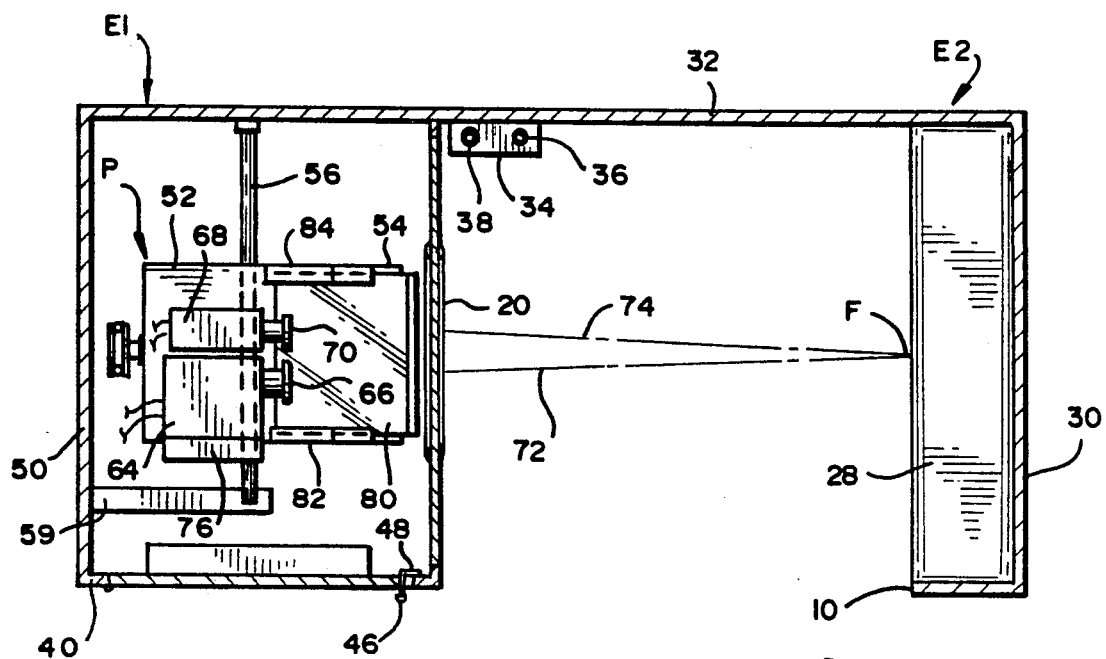
FIG. 4 is a cross-sectional view taken along the line 4—4 of FIG. 2 and viewed in the direction of the arrows.

Enclosure E2 has an accessway 10, as best shown in FIGS. 1 and 4. The accessway 10 is, preferably, selectively partially blockable by movable curtain 12. Curtain 12 is movable along rod 14, as best shown in FIG. 3, so that a user may enter or exit the enclosure E2. We prefer that the curtain 12 have a vertical dimension of roughly half the height of the accessway 10, since we have found this to provide a more attractive appearance while also sufficiently blocking ambient illumination. The curtain 12 is comprised of an opaque material.

Enclosures E1 and E2 share a common wall 16, as best shown in FIGS. 1, 2 and 4. The wall 16 spans the width of enclosures E1 and E2, and extends the height thereof. Transparent windows 18 and 20 are positioned in wall 16 within openings formed therein. Also positioned in wall 16 is a strobe light 22, a dollar bill and change receiver 24 of conventional design, and a photograph delivery slot 26.

As best shown in FIG. 4, bench 28 is formed along end wall 30 of enclosure E2. The bench 28 is at a selected location for posing of a user within the enclosure E2. Also appropriately positioned in the enclosure E2 along the side wall 32 is control module 34. The module 34 has a push button 36 for causing a photograph to be taken, and a toggle switch 38 for adjusting the elevation of the photograph to be taken.

Side wall 40 of enclosure E1, as best shown in FIGS. 1-3, has an opening 42 therein which is closed by door 44. Door 44 has a rotatable handle 46 and an integral locking element 48, as best shown in FIG. 4, for causing the door 44 to be secured in the closed position. End wall 50 extends between the side walls 40 and 32, as best shown in FIG. 4, in order to define an open interior for the enclosure E1.

Figure 5:
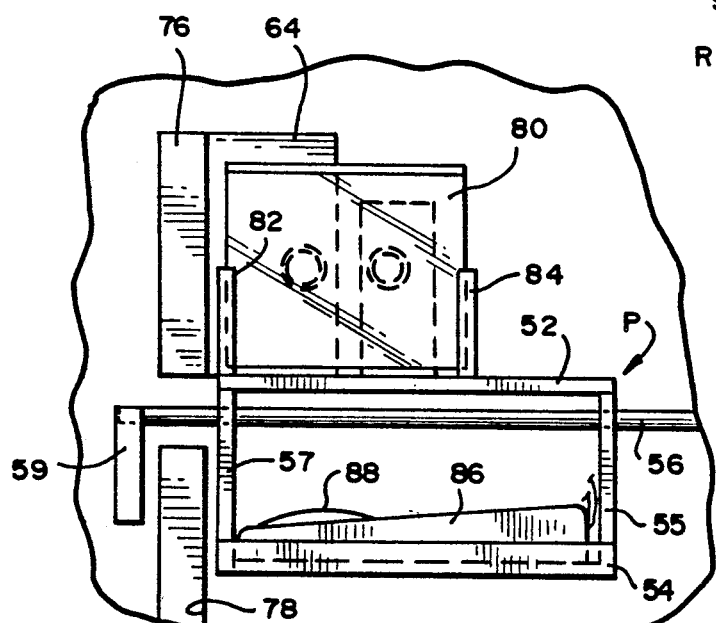
FIG. 5 is a fragmentary front elevational view of the self photography system of the invention; and, FIG. 6 is a fragmentary cross-sectional view taken along the line 6—6 of FIG. 1 and viewed in the direction of the arrows.

Platform assembly P, as best shown in FIGS. 2, 4 and 5, comprises an upper horizontal platform 52 and integral lower platform 54, both pivotal about rod 56. The upper platform 52 has a length less than the length of the lower platform 54 and is connected thereto by supports 55 and 57. One end of shaft 56 is secured to wall 32, while the other end is secured to bracket 59 in order to permit opening of door 44. The platform assembly P is pivotal about shaft 56 by operation of motor 58 and cord 60. Operation of the motor 58, in response to movement of the toggle switch 38, causes the cord 60 to be wound onto or from sheave 62, thereby causing the platform assembly P to be moved upwardly or downwardly in response thereto.

Photographic camera 64 having a conventional image inlet 66 is mounted on upper platform 52. Video camera 68 having conventional image inlet 70 is also mounted to upper platform 52, preferably closely adjacent to photographic camera 64. The image inlets 66 and 70 are both directed at the point F of bench 28, as indicated by the lines 72 and 74 of FIG. 4, and are preferably a common distance above platform 52. We prefer that the photographic camera 64 be of the self-developing type, such as marketed by Polaroid Corporation, but those skilled in the art will appreciate that other recording media are usable within the scope of the invention.

The photographic camera 64 has a photograph discharge element 76, as best shown in FIGS. 4 and 5, which is aligned with chute 78 communicating with slot 26, as best shown in FIGS. 2 and 5. In this way, the photograph resulting from operation of photographic camera 64 is presented to the user of the booth B. Because the element 76 is on the side of camera 64 opposite the camera 68, the cameras 64 and 68 can be more closely positioned relative to each other.

Semi-reflective mirror 80 is mounted between supports 82 and 84 affixed to and pivotal with upper platform 52. The mirror 80 is 50% reflective and 50% transmissive, so that the image at the point F above bench 28 may be perceived therethrough by the image inlets 66 and 70. The mirror 80 is, preferably, disposed at an angle of 45° to the upper platform 52.

Video display 86, as best shown in FIGS. 2-3 and 5, is mounted to lower platform 54 forwardly of photographic camera 64. Video display 86 is operably connected by suitable wiring to the outlet of video camera 68, in order to receive the image perceived by image inlet 70. Video display 86 has a monitor or outlet 88 by which the image perceived by the video camera image inlet 70 is caused to be viewed. The outlet 88 is positioned on platform 54 so that the image is directed, as indicated by the arrow 89, at that point on the mirror 80 where the image inlet 66 of the photographic camera 64 is also directed. In this way, the image perceived by the video camera 68 is displayed on the mirror 80 at precisely the same location on mirror 80 where the image inlet 66 is directed. Because the mirror 80 is 50% reflective and 50% transmissive, the displayed image is reflected by the mirror 80 to the user at the bench 28, while, at the same time, the image inlet 66 is perceiving the image of that user on the bench 28. While we prefer that display 86 be below cameras 64 and 68, those skilled in the art will appreciate that this orientation could be reversed.

We position the photographic camera 64 and the video camera 68 in relatively close juxtaposition, so that the respective image inlets 64 and 70 perceive substantially the same image. In using the booth B, the individual at the bench 28 will, as a consequence of the alignment of monitor 88, look to the image displayed on the mirror 80 through window 20. That image is the image perceived by the video camera 68, so that the user, because of the alignment of the image inlets 66 and 70, is looking at substantially the image perceived by both cameras. Also, because the monitor outlet 88 is in alignment with the image inlet 66, then the user is also looking directly into the inlet 66. The result is that the user sees the image which will be taken by the photographic camera 64, and can select the appropriate pose prior to operation of the film camera 64 through push button 36.

We have found that positioning the cameras 64 and 68 closely adjacent each other provides the desirable benefit of causing the image perceived by the camera 68 to be photographed by the camera 64. The close spacing of the cameras 64 and 68 minimizes any divergence between the perceived images, while assuring that the user is looking directly into the image inlet 66 of the photographic camera 64. Increased spacing between the cameras 64 and 68, we believe, would increase divergence between the perceived images, so that the image photographed by the camera 64 would more greatly depart from that perceived by the camera 68.

As noted, the platform assembly P is pivotal in response to operation of toggle switch 38, so that the user may adjust the vertical location of the point F. Since the cameras 64 and 68, mirror 80, and display 86 all pivot as a unit in response to operation of motor 58, then any inaccuracies on account of height are minimized. Appropriate switches are provided within the interior of enclosure E1 to prevent excessive pivoting of the platform assembly P.

Figure 6:
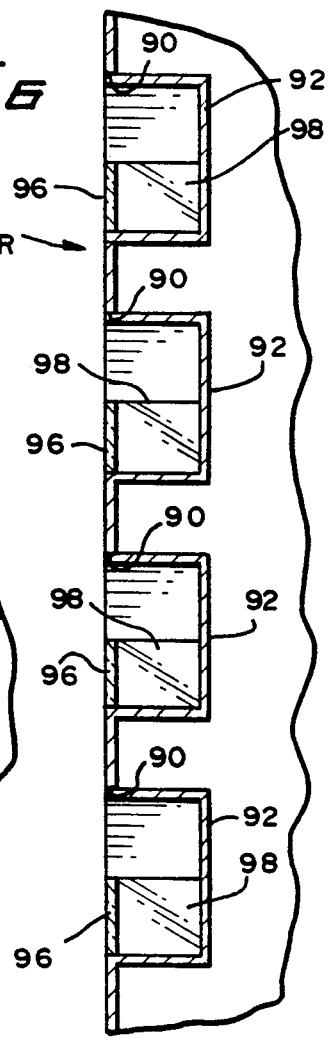

It is not unusual for a distant friend or relative to request a recent photograph of an individual. The booth B, as explained, permits such a photograph to be taken. In order to further increase the desire to have such a photograph taken, we provide a greeting card display rack assembly R integral with the door 44. Rack assembly R, as best shown in FIGS. 1 and 6, comprises a plurality of openings 90 in the door 44 in vertically spaced parallel relation. Transparent card holders 92 are positioned in each of the openings 90, in order to hold one or more greeting cards 94, as best shown in FIG. 1. Each card holder 92 comprises a front transparent member 96 and an inwardly extending divider 98, thereby dividing each holder 92 into two. Naturally, the member 96 has a height less than the height of the opening 90, in order to permit the user to remove a card 94. We prefer that the front members 96 be in alignment with the surface of door 44, in order to provide an aesthetically pleasing appearance, while also assuring that the booth B does not exceed the requisite dimensions.

Use and operation of the booth B is relatively simple, and permits a high quality photograph to be taken. The user merely enters the accessway 10 and closes the curtain 12. The user then stands against or is seated on bench 28, and inserts the appropriate amount of money into money receiver 24. The user then looks at the window 20, and thereby views the image reflected by the mirror 80 from the monitor outlet 88. Toggle switch 38 may be operated for vertical alignment, while operation of push button 36 initiates the camera 64.

We provide a strobe 100 behind window 18 in order to provide sufficient illumination for the photograph to be taken. We have also found that the light 22, which is interconnected with the camera 64 and the strobe 100, will provide additional upwardly directed illumination. The result of the strobe 100 and the light 22 is that sufficient illumination is provided in the enclosure E2 for the photograph to be taken by the camera 64. Naturally, the cameras 64 and 68, display 86 and related components are all appropriately interconnected by suitable wiring to assure proper operation.

After the photographs have been taken and dispensed to the user through slot 26, then the user may peruse the greeting cards 94 displayed on the rack means R. An appropriate card 94 may be selected, with one or more photographs inserted therein. The greeting cards 94 are of standard format, and may subsequently be mailed to a recipient.

While this invention has been described as having a preferred design, it is understood that it is capable of further modifications, uses and/or adaptations of the invention, following in general the principle of the invention and including such departures from the present disclosure as come within known or customary practice in the art to which the invention pertains, and as may be applied to the central features hereinbefore set forth, and fall within the scope of the invention of the limits of the appended claims.

What we claim is:

1. A self photography system, comprising:
   (a) a photographic camera having an image inlet;
   (b) a video camera having an image inlet, and an image outlet, said video camera disposed proximate said photographic camera;
   (c) a pane of material having light reflective and light transmissive properties operably associated with and disposed forwardly of said photographic and video camera image inlets; and
   (d) a video display means operably connected to said video camera image outlet for displaying the image perceived by said video camera inlet, said video display means aligned with said pane for displaying the image thereon.

2. The system of claim 1, wherein:
   a) said pane is angularly disposed relative to said cameras.

3. The system of claim 2, wherein:
   a) said video display means is disposed below said cameras.

4. The system of claim 2, wherein:
   a) said pane is disposed at an angle of substantially 45° relative to the axis of said photographic camera inlet.

5. The system of claim 1, wherein:
   a) said video display means includes a monitor, said monitor aligned with said photographic camera image inlet.

6. The system of claim 5, wherein:
   a) said pane is disposed at an angle of substantially 45° to said photographic camera image inlet; and
   b) said video display means is disposed below said photographic camera.

7. The system of claim 6, wherein:
   a) said video display means is disposed forwardly of said cameras.

8. The system of claim 1, wherein:
   a) each of said inlets has an axis of perception, and said axes are focused on a common point in space.

9. The system of claim 8, wherein:
   a) said axes lying on a common plane.

10. The system of claim 1, wherein:
    a) support means operably interconnect said cameras and
    b) means are operably associated with said support means for pivoting said support means and thereby said cameras.

11. The system of claim 10, wherein:
    a) said video display means is operably connected to said support means and pivotal therewith.

12. The system of claim 11, wherein:
    a) said cameras are disposed above said support means pivot axis; and, b) said video display means is disposed below said support means pivot axis.

13. The system of claim 12, wherein:
a) said video display means is disposed forwardly of the pivot axis of said support means.

14. The system of claim 1, wherein:
a) said photographic camera has a photograph discharge means, and said photograph discharge means is disposed along a side of said photographic camera opposite to said video camera.

15. The system of claim 1, wherein:
a) said photographic camera is a film camera.

16. The system of claim 10, wherein:
a) said pane is secured to said support means and pivotal therewith.

17. A self photography booth, comprising:
a) an enclosure having first and second spaced side walls interconnected by spaced first and second end walls, one of said side walls having an entrance therein permitting access to the interior of said enclosure;
b) at least a first opening in one of said end walls;
c) a self photography system operably associated with said first opening and disposed exteriorly relative to the associated end wall, said self photography system comprising a photographic camera having an image inlet directed at the other of said end walls, a video camera having an image inlet directed at said other of said end walls in substantial alignment with said photographic camera image inlet so that said image inlets perceive substantially the same image, a semi-transparent mirror interposed between said cameras and said other of said end walls, and a video display having the inlet thereof operably connected to said video camera and the outlet thereof directed at said mirror so that the image perceived by said video camera is directed by said mirror through said first opening; and,
d) means positioned in said enclosure and operably connected to said photographic camera for causing operation thereof.

18. The booth of claim 17, wherein:
a) said mirror is disposed at an angle relative to the associated end wall.

19. The booth of claim 18, wherein:
a) said mirror is disposed at an angle of substantially 45° to the associated end wall.

20. The booth of claim 17, wherein:
a) said video display outlet is aligned with said photographic camera image inlet.

21. The booth of claim 20, wherein:
a) said video display is disposed below said mirror.

22. The booth of claim 17, wherein:
a) means operably secure said cameras, said video display, and said mirrors;
b) said securing means are pivotal; and,
c) means are operably associated with said securing means for causing pivoting thereof.

23. The booth of claim 22, wherein:
a) said image inlets are commonly disposed above a portion of said securing means.

24. The booth of claim 22, wherein:
a) said securing means includes first and second interconnected platforms, said cameras each being mounted to said first platform and said video display being mounted to said second platform.

25. The booth of claim 24, wherein:
a) said first platform is disposed above said second platform.

26. The booth of claim 17, further comprising:
a) a secondary enclosure secured to said first mentioned enclosure and extending from said end wall having said opening; and,
b) said self photography system disposed within said second enclosure.

27. The booth of claim 26, wherein:
a) an access door is pivotally secured to said secondary enclosure for permitting access to said self photography system; and,
b) at least a first display means is operably secured to said door for displaying a photograph holder.

28. The booth of claim 17, wherein:
a) said photographic camera is a film camera.

29. Self-service photography system, comprising:
a) a housing comprising first and second integral enclosures, said enclosures each having an interior and being of substantially equal height and width but dissimilar length;
b) said first enclosure includes a pivotal door securing an opening to the interior thereof;
c) an accessway disposed in said second enclosure for permitting access to the interior thereof;
d) a self photography system positioned in said first enclosure for permitting an individual located within said second enclosure to take a photograph thereof; and,
e) at least a first rack means secured to said door for displaying and permitting retrieval of a photograph holder disposed therein.

30. The system of claim 29, wherein:
a) there are a plurality of rack means secured to said door.

31. The system of claim 30, wherein:
a) said rack means are aligned in a plurality of vertically spaced rows, each row having at least two rack means.

32. The system of claim 31, wherein:
a) lock means are operably associated with said door for selectively securing said door in a closed position.

33. The system of claim 30, wherein:
a) each of said rack means is recessed into said door.

34. The system of claim 30, wherein:
a) said rack means each includes a transparent front portion for permitting viewing of the enclosed photograph holder.

35. The system of claim 14, further comprising:
(a) at least a first photograph holder positioned in at least one of said rack means.

36. The method of taking a self portrait, comprising the steps of:
(a) providing a self photography system comprising camera means including photographic and video image producing means, a semi-transparent angularly disposed mirror in front of the camera means and a video display below the camera means in alignment with the mirror for directing the image perceived by the video image producing means onto the mirror for thereby being directed to a user;
(b) posing in front of the camera means;

37. A self photography system, comprising:
(a) camera means including photograph producing means and video image producing means, said camera means including an image inlet and a video image outlet;

(b) a pane of material having light reflective and light transmissive properties operably associated with and disposed forwardly of said image inlet; and, (c) video display means operably connected to said video image outlet for displaying the image perceived by said image inlet, said video display means aligned with said pane for displaying the image thereon.

38. The system of claim 37, wherein:

(a) said pane of material is angularly disposed relative to said image inlet.

39. The system of claim 38, wherein:

(a) said pane has a first edge adjacent said camera means and a second edge remote therefrom, said first edge is at an elevation less than the elevation of said second edge.

40. The system of claim 37, wherein:

(a) said video display means is disposed below said camera means.

41. The system of claim 37, wherein:

(a) said video display means is disposed forwardly of said camera means.

42. The system of claim 41, wherein:

(a) said video display means is disposed below said camera means.

43. The system of claim 37, wherein:

(a) means are operably associated with said camera means, said pane and said video display means for causing cooperating pivoting thereof.

44. The system of claim 37, wherein:

(a) payment receiving means are operably associated with said camera means for controlling operation thereof.

45. The system of claim 37, wherein:

(a) photographic discharge means are operably associated with said camera means and disposed adjacent thereto for dispensing a photograph to a user.

46. The system of claim 45, wherein:

(a) said discharge means includes a chute having a discharge end disposed below said camera means.

* * * * *

UNITED STATES PATENT AND TRADEMARK OFFICE
CERTIFICATE OF CORRECTION

PATENT NO. : 5,072,246
DATED : December 10, 1991
INVENTOR(S) : Thayer et al.

It is certified that error appears in the above-identified patent and that said Letters Patent is hereby corrected as shown below:

Column 8, line 66, after "b) posing in front of the camera means;" please add:

--c) viewing the image perceived by the camera means by looking at the mirror and thereby looking into the image inlet of the camera means; and d) operating the camera means and generating a photograph.--

Signed and Sealed this

Twenty-seventh Day of December, 1994

Attest:

BRUCE LEHMAN

Attesting Officer        Commissioner of Patents and Trademarks